INVENTORS
FRANK W. VanLUIK, JR.
PETER E. COFFEY

BY Charles W. Helzer

ATTORNEYS 3,674,435
LOW CONCENTRATION CONSTITUENT OF GASEOUS MIXTURE SELECTIVE CONVERTER AND DETECTOR
Frank W. Van Luik, Jr., and Peter E. Coffey, Schenectady, N.Y., assignors to Environment/One Corporation, Schenectady, N.Y.
Filed June 5, 1970, Ser. No. 43,793
Int. Cl. G01n 31/02
U.S. Cl. 23—232 R                                      18 Claims

ABSTRACT OF THE DISCLOSURE

Accurate measurement of the concentration level of a first selected gaseous material in a sample atmosphere having present therein a second interfering gaseous material is obtained by selectively reducing the concentration of the second interfering gaseous material while maintaining the proportionate concentration level of the selected gaseous material at a measurable level. The selected gaseous material is then converted into condensation nuclei which in turn are measured to yield an accurate indication of the concentration of the selected gaseous material in the sample atmosphere.

BACKGROUND OF THE INVENTION

Field of invention

This invention relates to a new and improved means and method of detecting air pollution and more specifically to a means and method of detecting the presence of low concentrations of a first gas such as sulfur dioxide in the presence of an interfering second gas such as carbon monoxide.

Prior art problem

The problem of air pollution has recently given rise to many and varied air pollution detecting means, the demand for improved sensitivity of which has steadily increased. A particular problem encountered in the use of these prior art detecting means lies in the extreme difficulty in detecting low concentrations of sulfur dioxide. One of the known methods of detecting the presence of sulfur dioxide ($SO_2$) is illustrated in U.S. Pat. 3,198,721. This method involves obtaining a sample of the air to be tested and converting the sample into an aerosol forming substance. By this method any $SO_2$ present in the sample will be converted to $SO_3$ by the reaction of oxygen ($O_2$) with the $SO_2$. The converted gas ($SO_3$) is then supplied to an aerosol particle detector which includes a humidifier. Upon passing through the humidifier, the $SO_3$ is further converted to sulfuric acid ($H_2SO_4$) which then forms aggregates or particles known as condensation nuclei. The condensation nuclei thus formed are supplied to an expansion chamber where an expansion process causes water droplets to form about the condensation nuclei. These droplets are then irradiated with light and scattered irradiation from the irradiated droplets indicates the presence of $SO_2$ in the sample of air to be tested. Electrical indication of the intensity of scattered irradiation provides a measurement of the total amount of $SO_2$ contained in the sample of air being tested.

A significant problem in the detection and measurement of low concentrations of $SO_2$ exists when the ambient air also contains significant levels of carbon monoxide (CO). Concentration levels in excess of 1 p.p.m. of CO in the air to be tested can cause interference in the accurate detection and measurement of the condensation nuclei indicating the amount of $SO_2$ present in the air sample.

While the CO can be eliminated from the air sample by burning in the presence of bottle gas, for example, such removal techniques also remove the $SO_2$, thus preventing measurement of the concentration thereof.

A similar problem exists in air pollution control in the measurement of oxides of nitrogen as a standard air pollution contaminant. It is difficult to detect and measure low levels of nitrogen dioxide ($NO_2$) when in the presence of significant levels of nitric oxide (NO).

SUMMARY OF THE INVENTION

It is therefore a primary object of the present invention to provide a new and improved means and method for detecting the presence of a first gas (such as $SO_2$) in a sample atmosphere (such as air) also containing excessive proportions of a second interfering gas (such as CO).

It is a further object of the present invention to provide a new and improved means and method for the accurate detection and measurement of extremely dilute concentrations of sulfur dioxide (.005 p.p.m.) in samples of air containing carbon monoxide in concentrations in excess of 1 p.p.m.

It is a further object of the present invention to provide a new and improved means and method for the accurate detection and measurement of extremely dilute concentrations of nitrogen dioxide when in the presence of significant levels of nitric oxide.

In accordance with the present invention, a permselective membrane is employed in the detection means to reduce the concentration of the interfering gas to a level which will no longer interfere with the detection and measurement of the selected gas while maintaining the concentration of the selected gas at such a level as to still be measurable.

A permselective membrane as employed in the present invention is a thin non-porous membrane through which gaseous state materials, except the permanent gases, will pass by entering into solution with the membrane material and diffusing therethrough. The diffusion rate of a particular gas through a particular membrane under a given set of operating conditions depends upon the permeability of the gas in the particular non-porous membrane material. This permeability is measured by a permeability constant for that particular gas and, at a given temperature, a particular membrane material will possess different permeability constants for different gases. The ratio of the gases of a mixture passed by a membrane is independent of pressure and gas flow fluctuations. In view of these characteristics, a permselective membrane of suitable material may be successfully employed in the present invention to reduce the concentration level of an interfering gas in a given air sample while passing a proportionate quantity of the selected gas at a measurable concentration level. For clarity, it will be assumed that the selected gas is $SO_2$ and the interfering gas is CO.

In the application of the present invention, a measured sample of the air or other gaseous medium to be studied is first filtered to remove any particles contained therein. The filtered gas is then passed across the face of a permselective membrane which has been designed to pass a proportionate amount of the $SO_2$ contained therein. While the permselective membrane will also pass a predetermined proportionate amount of the CO contained in the gas, the concentration of CO in the sample on the other side of the membrane will be reduced to a level which will not have an adverse effect on the subsequent conversion reaction and $SO_2$ measurement.

The concentration of $SO_2$ in the air sample passed through the membrane is determined by converting the $SO_2$ to condensation nuclei, which are then measured electrically. Condensation nuclei is a generic term applied to small airborne particles which are characterized by the fact that they serve as the nuclei upon which a fluid such as water, for example, condenses to form droplets. Such nuclei, as this term is understood in the art, include microscopic and submicroscopic particles ranging in size from $10^{-4}$ cm. radius to $10^{-8}$ cm. radius. This mixture takes place in the presence of a converter unit which might be in the form of a hot platinum wire, a source of ultraviolet light or a spark gap. The gas mixture is then converted to an aerosol forming substance $SO_3$ by the reaction of the $SO_2$ with the $O_2$ contained in the clean air. A humidifier in the line provides water vapor which reacts with the $SO_3$ thus converted to produce $H_2SO_4$ in the form of particles or condensation nuclei. The sample containing the condensation nuclei may then be reunited wtih the remainder of the original measured quantity of gas to be studied to insure volumetric uniformity of the sample. The gas mixture is then fed into a condensation nuclei counter (CNC). The CNC includes an expansion chamber where the condensation nuclei are subjected to an expansion process which causes water droplets to form having the condensation nuclei as centers. By irradiating these water droplets an electrical indication of the intensity of the scattered irradiation can be obtained. This indication provides an accurate measurement of the concentration of $SO_2$ in the gas sample being studied.

In forming the condensation nuclei the portion of the air sample which passes through the membrane is mixed with a measured quantity of clean air.

The clean air supplied to the converted unit is preferably produced from a quantity of the original sample of the gas being studied to insure volumteric uniformity of the measured quantity. This gas quantity is rendered "clean" as far as the measurement of $SO_2$ concentration under the present invention by the removal therefrom of naturally occurring condensation nuclei, CO and $SO_2$. Naturally occurring condensation nuclei can be removed by filtration. $CO/SO_2$ removal can be effected by burning the gas sample in the presence of bottle gas or in a Hopkalite type of burner. The requisite $O_2$ may alternatively be supplied from a separate source free of $SO_2/CO$. In applications of this type it will be necessary to make the requisite volumetric compensations to achieve accurate measurement of $SO_2$ concentration in the air sample.

DESCRIPTION OF THE DRAWINGS

Other objects, features and many of the attendant advantages of this invention will be appreciated more readily as the same become better understood by reference to the following detailed description, when considered in connection with the accompanying drawings, wherein like parts in each of the several figures are identified by the same reference character, and wherein.

DETAILED DESCRIPTION OF THE PREFERRED EMBODIMENTS

Figure 1:
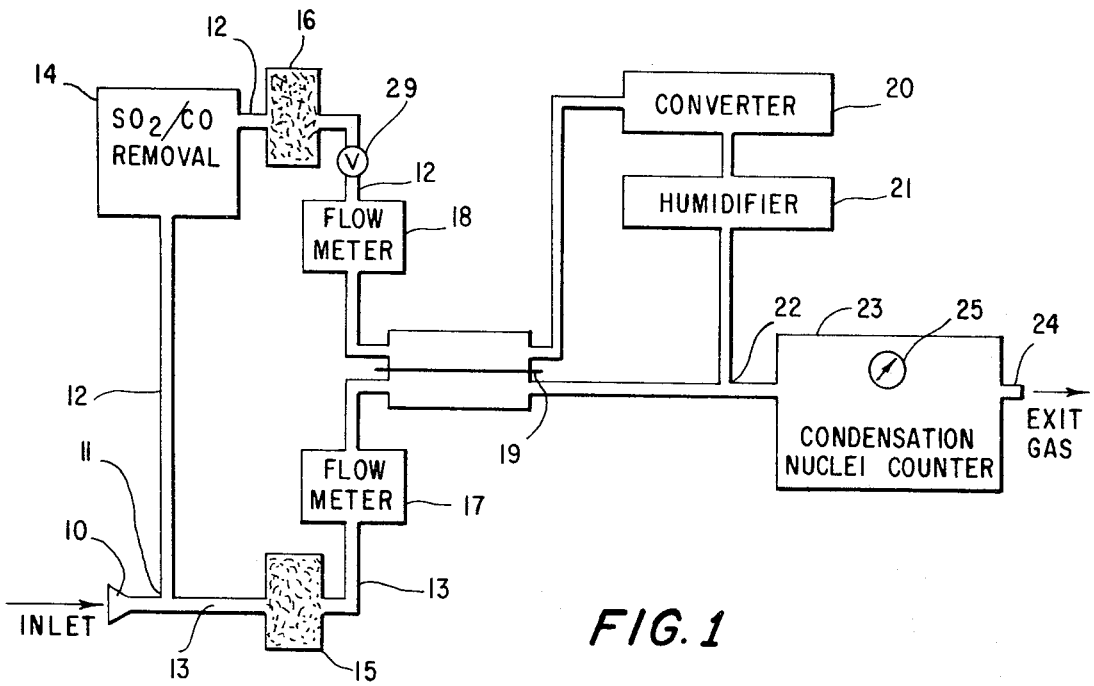
FIG. 1 is a functional block diagram of an apparatus used in carrying out the new and improved method of measuring the concentration level of sulfur dioxide made possible by the present invention.

In carrying out the new and improved method of measuring the concentration level of sulfur dioxide ($SO_2$) in accordance with the present invention, an apparatus arrangement such as that shown in FIG. 1 is used. In FIG. 1 the sample of air to be studied is taken in through an input 10. The stream of air is divided at the branch 11 and passes into two separate flow paths 12, 13. The air sample in flow path 12 passes through a purification unit 14 where the sulfur dioxide and carbon monoxide are removed by conventional means, thus rendering the air "clean" as far as these two contaminants are concerned. The $SO_2$, CO removal can be effected by burning the air sample in bottle gas or by employing a Hopkalite type burner. The two air streams then pass through filters 15, 16 which may comprise a housing containing glass wool, or other suitable filtering element. The filters 15, 16 function to remove any naturally occurring condensation nuclei in the air samples. From the filters 15, 16 the air streams pass through flow meters 17, 18 which measure the air flow of the two streams. A valve 29 in one of the lines is operative to adjust the proportionate amount of air passing in each of the paths 12, 13 through the flow meters 17, 18.

The air in path 12 passes through a flow meter 17 and then passes across the face of a permselective membrane 19. The permselective membrane 19 can be made of silicone rubber. In the case of silicone rubber, the permeability constant for $$SO_2 \text{ is } 1500 \times 10^{-9} \frac{cc. \times cm.}{sec. \times cm^2. \times cm. \, hg}$$

and for $$CO \text{ it is } 34 \times 10^{-9} \frac{cc. \times cm.}{sec. \times cm^2 \times cm. \, Hg}$$

Thus while the permselective membrane 19 will also pass CO, the membrane is about 50 times more permeable to $SO_2$ than to CO so the concentration level of CO on the other side of the membrane will be reduced to a level which will not interfere with the subsequent $SO_2$ concentration measurement. The thickness and surface area of the permselective membrane are selected according to well known parameters. A thickness of 0.001 inch and a surface area of 100 cm.$^2$ has been found to be suitable. The $SO_2$ and CO which pass through the membrane 19 mix with the "clean" air in the air path 12 and the mixture passes into a converter unit 20. The converter 20 may constitute a hot platinum wire, a source of ultraviolet light, light, a spark gap or some suitable element for converting the $SO_2$ to be detected into an aerosol particle forming substance. The converter unit 20 acts to convert the $SO_2$ to $SO_3$ by reaction with oxygen ($O_2$) contained in the "clean" air. This converted $SO_3$ is then supplied to a humidifier 21 where it is further converted to sulfuric acid ($H_2SO_4$) which then forms condensation nuclei. Alternatively, the conversion and humidification could be achieved in an essentially single step process carried out in a humidified conversion chamber.

The partial air sample containing the previously formed condensation nuclei as described above, then is reunited at a branch 22 with the remainder of the original sample of air to maintain volumetric uniformity of the sample. The reunited sample containing the condensation nuclei is then supplied to a condensation nuclei counter 23. For a detailed description of the construction and operation of the condensation nuclei counter 23, reference is made to U.S. Pat. 2,684,008, issued on July 20, 1954 to Bernard Vonnegut. In the condensation nuclei counter the humidified sample to be tested is introduced into an expansion chamber where it periodically is expanded by means of a cyclically driven flexible diaphragm or valved vacuum system. This results in alternately expanding the volume of the chamber thus periodically subjecting the air (and entrained condensation nuclei) in the chamber to an adiabatic expansion.

During the expansion, the air within the container is adiabatically cooled causing supersaturation and in turn condensation of the water vapor about the nuclei. The chamber is traversed by a beam of light which is scattered by the cloud of droplets within the chamber. The scattered light produces an electric signal which is a measure of the condensation nuclei present. In a complete operating cycle, the expansion chamber is returned to normal ambient condition intermediate each expansion causing the droplets to be evaporated and the thus expanded and tested air sample to be flushed through an exhaust conduit 24.

The cycle of operation is then repeated to provide a continuous indication on the meter 25 of the number of condensation nuclei present, and hence the concentration of SO₂ present in the sample atmosphere being tested.

The operable limits of this equipment are dependent upon the final presence of condensation nuclei in sufficient numbers to be measured.

In the illustration herein, employing a silicone rubber membrane, the minimum ambient air SO₂ detection level would be 0.0005 p.p.m. which is below any normal ambient air measurement required for air pollution control studies. The maximum permissible CO interference level would be about 150 p.p.m. which is at the upper value of any concentration normally encountered in air pollution studies.

Figure 2:
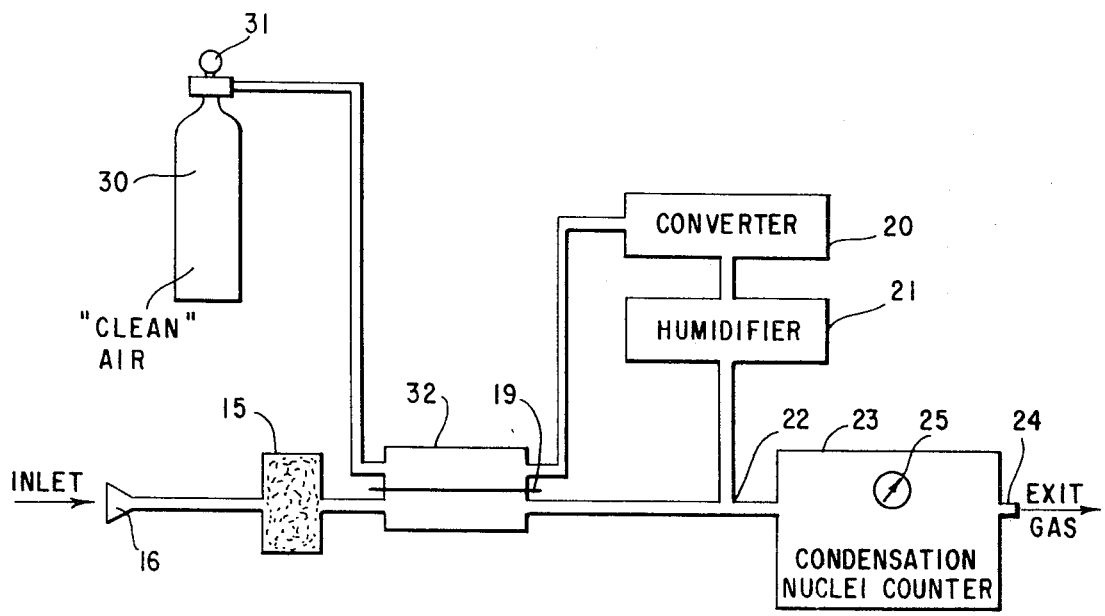
FIG. 2 is a functional block diagram of an alternate form of apparatus suitable for carrying out the novel method of measuring the concentration level of sulfur dioxide in accordance with the present invention.

A second form of the invention is illustrated in FIG. 2 of the drawings, and includes a source of "clean air" 30 from which the SO₂, CO and all naturally occurring condensation nuclei have been removed. This air passes through flow meter 31 and mixes with the SO₂ enriched sample which passes through the permeselective membrane 19 in the mixing chamber 32. From this point the operation is the same as that of the apparatus illustrated in FIG. 1. Measurement of the "clean" air supplied is provided by the flow meter 31 and by suitable calculations the equivalent volumetric flow of the air sample can be calculated.

As set forth hereinabove, the specific material employed as the permselective membrane will be determined by the particular gaseous material which has been selected for measurement and the particular gaseous material which is considered interfering to the accuracy of such measurement. Thus in the specific embodiments above, silicone rubber was selected because it is about 50 times as permeable to SO₂ as to CO. In the case of NO₂ measurement in the presence of interfering NO, silicone rubber is also suitable. For silicone rubber, NO₂ has a permeability constant of $760 \times 10^{-9}$ while that of NO is only $60 \times 10^{-9}$. It will be obvious to those skilled in the art to select the proper membrane material for a given measurement. While a membrane change will necessitate simple recalibration of the data, it will be obvious that one unit of the type disclosed will have utility in a wide range of applications and could make measurements of various gaseous material concentration levels.

From the foregoing description, it can be appreciated that the invention provides a new and improved method and apparatus for measuring the concentration level of gaseous material such as sulfur dioxide, which is highly accurate and which is capable of determining the concentration level of such a gas in air containing a high level of an interfering gas. The instrument comprises a new scientific tool with which it is possible to investigate phenomenon heretofore undiscoverable. The instrument is also capable of use as a leak detector, or as an instrument for measuring the combustion efficiency of internal combustion engines. This instrument incorporates of all of the above characteristics, yet is constructed of readily available components, is simple in design, and relatively inexpensive to manufacture.

Obviously, other modifications and variations of the invention are possible in the light of the above teachings. It is, therefore, to be understood, that changes may be made herein which are within the full intended scope of the invention as defined by the appended claims.

What we claim as new and desire to secure by Letters Patent of the United States is:

1. A method of measuring the concentration level of a first gas selected from the group consisting of SO₂ and NO₂ in a sample atmosphere containing excessive proportions of a second interfering gas selected from the group consisting of CO and NO respectively, which comprises obtaining a sample of the atmosphere to be studied, discrminately reducing the concentration level of the second interfering gas in the sample below a minimum acceptable level while maintaining the proportionate concentration of the first gas at a measurable level, converting the thus proportionately enriched first gas to condensation nuclei and measuring the condensation nuclei thus formed to determine the concentration level of the first gas in the sample atmosphere.

2. The method of claim 1, including the step of removing naturally occurring condensation nuclei from the sample atmosphere prior to converting the first gas into condensation nuclei.

3. A method of measuring the concentration level of a first gas selected from the group consisting of SO₂ and NO₂ in a sample atmosphere containing excessive proportions of a second interfering gas selected from the group consisting of CO and NO respectively, which comprises obtaining a sample of the atmosphere to be studied, selectively increasing the proportionate amount of the first gas desired to be measured in the sample, converting the thus proportionately increased first gas into condensation nuclei and measuring the condensation nuclei thus formed to determine the concentration level of the first gas in the sample atmosphere.

4. The method of claim 3, including the step of removing naturally occurring condensation nuclei from the sample atmosphere prior to converting the first gas into condensation nuclei.

5. The method of claim 4, wherein the sample of gaseous atmosphere selectively treated to increase the concentration of the first gas relative to the second interfering gas is only a proportionate part of a larger sample and the proportionate part thus treated is combined with the remainder of the sample atmosphere prior to measuring the condensation nuclei to determine the concentration level of the first gas.

6. An instrument for measuring the concentration level of a first gas selected from the group consisting of SO₂ and NO₂ in an atmosphere being studied which contains excessively proportions of a second interfering gas selected from the group consisting of CO and NO respectively, including in combination, intake means for obtaining a sample of the atmosphere being studied, filter means connected to the intake means for removing naturally occurring condensation nuclei from the sample, permselective membrane means having a first side connected to the intake means for selectively increasing the proportionate amount of the desired first gas contained in the sample supplied to the second side of the membrane, supply means connected to the second side of the permselective membrane to supply a clean gas to mix with the first gas thus proportionately increased, condensation nuclei forming means connected to the second side of the membrane means for converting the proportionately increased first gas sample into condensation nuclei and measuring means connected to the condensation nuclei forming means for measuring the condensation nuclei thus formed whereby the concentration level of first gas in the atmosphere being studied can be determined.

7. The instrument of claim 6 in which the permselective membrane means passes the first gas from the first side to the second second side thereof at a rate faster than the second interfering gas is passed.

8. The instrument of claim 7, wherein the relative rates of passage of the first and second gases through the permselective membrane means are on the order of fifty to one (50:1).

9. A method of measuring the concentration level of SO₂ in air containing SO₂ and at least 1 p.p.m. CO which comprises obtaining a sample of the air to be studied, reducing the concentration level of CO in the sample below 1 p.p.m. while maintaining the proportionate concentration of SO₂ at a measurable level, converting the SO₂ to condensation nuclei and measuring the condensation nuclei thus formed to determine the concentration level of SO₂ in the air sample.

10. The method of claim 9, including the step of removing naturally occurring condensation nuclei from the sample of air prior to converting to the $SO_2$ into condensation nuclei.

11. A method of measuring the concentration level of $SO_2$ in air containing $SO_2$ and at least 1 p.p.m. CO which comprises obtaining a sample of the air to be studied, selectively increasing the proportionate amount of the $SO_2$ content of the sample, converting the increased $SO_2$ sample thus obtained into condensation nuclei and measuring the condensation nuclei thus formed to determine the concentration level of $SO_2$ in the air sample.

12. The method of claim 11, including the step of removing naturally occurring condensation nuclei from the sample of air prior to increasing the $SO_2$ content thereof.

13. The method of claim 12, wherein the sample air selectively treated to increase the $SO_2$ content relative to CO is only a proportionate part of a larger air sample and the proportionate part thus treated is combined with the remainder of the air sample subsequent to conversion but prior to measuring the condensation nuclei to determine the concentration level of $SO_2$ in the air sample.

14. An instrument for measuring the concentration level of $SO_2$ in an atmosphere being studied including in combination, intake means for obtaining a sample of the atmosphere being studied, filter means connected to the intake means for removing naturally occurring condensation nuclei from the sample, permselective membrane means having a first side connected to the outlet from the filter means for selectively increasing the proportionate amount of the $SO_2$ content of the sample supplied to the second side of the membrane, supply means connected to the second side of the permselective membrane to supply a clean gas containing $O_2$ to mix with the $SO_2$ thus proportionately increased, condensation nuclei forming means connected to the second side of the membrane means for converting the proportionately increased $SO_2$ content sample into condensation nuclei and measuring means connected to the condensation nuclei forming means for measuring the condensation nuclei thus formed whereby the concentration level of $SO_2$ in the atmosphere being studied can be determined.

15. The instrument of claim 14 in which the permselective membrane means passes the $SO_2$ from the first side to the second side thereof at a rate faster than the CO.

16. The instrument of claim 15 in which the relative rates of passage of the $SO_2$ and CO through the permselective membrane means are on the order of fifty to one (50:1).

17. The instrument of claim 16 in which only a proportionate part of the air sample from the intake means is supplied to the first side of the permselective membrane means and the instrument further includes means for combining the proportionate part whose relative $SO_2$ concentration has been increased with the remainder of the air sample after conversion to condensation nuclei but prior to measurement.

18. The instrument of claim 17 in which the condensation nuclei forming means includes in combination a source of ultraviolet light and a source of humidification.

References Cited

UNITED STATES PATENTS

| | | | |
|---|---|---|---|
| 3,545,931 | 12/1970 | McKinley, Jr. | 23—232 R |
| 2,897,059 | 7/1959 | Van Luik, Jr. | 23—232 E |
| 3,198,721 | 8/1965 | Rich | 23—232 RX |
| 3,396,510 | 8/1968 | Ward et al. | 55—16 |
| 2,968,722 | 1/1961 | Chleck et al. | 23—232 RX |
| 2,813,010 | 11/1957 | Hutchins | 23—232 R |

JOSEPH SCOVRONEK, Primary Examiner

U.S. Cl. X.R.

23—254 R; 55—16; 204—157.1 R, 193